US008700878B2

(12) United States Patent
Schwarz et al.

(10) Patent No.: US 8,700,878 B2
(45) Date of Patent: Apr. 15, 2014

(54) EVENT TRIGGERED MEMORY MAPPED ACCESS

(75) Inventors: William D. Schwarz, Austin, TX (US);
Joseph P. Gergen, Manchaca, TX (US);
Jason T. Nearing, Austin, TX (US);
Zheng Xu, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 749 days.

(21) Appl. No.: 12/485,190

(22) Filed: Jun. 16, 2009

(65) Prior Publication Data

US 2010/0318752 A1     Dec. 16, 2010

(51) Int. Cl.
*G06F 12/00*     (2006.01)

(52) U.S. Cl.
USPC .......................................... 711/202

(58) Field of Classification Search
USPC .......................................... 711/202
See application file for complete search history.

(56) References Cited

U.S. PATENT DOCUMENTS

| | | | |
|---|---|---|---|
| 7,665,002 B1 * | 2/2010 | White et al. ................... | 714/733 |
| 2006/0129999 A1 * | 6/2006 | Hiraoka et al. ................ | 717/128 |

OTHER PUBLICATIONS

List of White papers related to Nexus, www.nexus5001.org/techincal-documents/white papers.*
Nexus 5001 Forum Debug Interface Standard, version 2.0 IEEE-ISTO 5001, Dec. 2003.*
The evolution of powertrain microcontrollers and its impact on development processe and tools, Gary Miller et al.*
Multi-core analysis made easy with the Nexus 5001 debug spec, Neil Stollon, HDL Dynamics Mar. 2008.*

* cited by examiner

*Primary Examiner* — Duc Doan
(74) *Attorney, Agent, or Firm* — Yudell Isidore Ng Russell PLLC

(57) ABSTRACT

In one or more embodiments, a data processing system can include at least one core capable of executing instructions of an instruction set architecture and a triggered memory map access (tMMA) system coupled to the at least one core. The tMMA system can receive one or more events and, in response, perform one or more actions. For example, the actions can include transactions which can include a write to a an address of the memory map, a read from an address of the memory map, a read followed by write to two respective addresses of the memory map, and/or a fetch transaction. A result of a transaction (e.g., data read, data written, error, etc.) can be used in generating a trace message. For example, the tMMA system can generate a trace message that includes the result of the transaction and send the trace message to a trace message bus.

12 Claims, 9 Drawing Sheets

EVENT TRIGGERED MEMORY MAPPED ACCESS

BACKGROUND

1. Technical Field

This disclosure relates generally to responding to debug events executing on a processor, and more specifically, to providing event triggered trace data about the debug events utilizing memory mapped access.

2. Description of the Related Art

Developers of processors and/or applications usually need to have access to a basic set of development tool functions in order to accomplish their jobs. For run-control, a developer typically needs to query and modify when a processor is halted, showing all locations available in a supervisor map of the processor. Moreover, a developer also usually needs support for breakpoint/watchpoint features in debuggers, either as hardware or software breakpoints depending on the architecture. For logic analysis, a developer usually needs to access instruction trace information. A developer typically needs to be able to interrogate and correlate instruction flow to real-world interactions. A developer also usually needs to retrieve information on how data flows through the system and to understand what system resources are creating and accessing data. Additionally, a developer usually needs to assess whether embedded software is meeting a required performance level.

The Nexus 5001 Forum (formerly known as the global embedded processor debug interface standard consortium (GEPDISC)) was formed to develop an embedded debug/trace interface standard (the "Nexus standard") for embedded control applications. The Nexus standard is particularly applicable to the development of automotive powertrains, data communication equipment, computer peripherals, wireless systems, and other control applications. The Nexus standard provides a specification and guidelines for implementing various messages, e.g., program trace messages (such as branch history messages and synchronization messages), data trace messages, and task/process identification messages (such as ownership trace messages), that may be utilized in debugging applications while minimally impacting operation of a system under development. As defined by the Nexus standard, a program trace message is a message that is provided in response to a change of program flow. According to the Nexus standard, a data trace message is a message that provides visibility of a target processor when a memory write/read reference is detected that matches debug logic data trace attributes. The Nexus standard also defines an ownership trace message (OTM) as a message that provides a macroscopic view of a processor that may be used for task flow reconstruction when debugging software that is written in a high-level language.

BRIEF DESCRIPTION OF THE DRAWINGS

The present disclosure is illustrated by way of example and is not limited by the accompanying figures. Elements in the figures are illustrated for simplicity and clarity and have not necessarily been drawn to scale.

DETAILED DESCRIPTION

Figure 1:
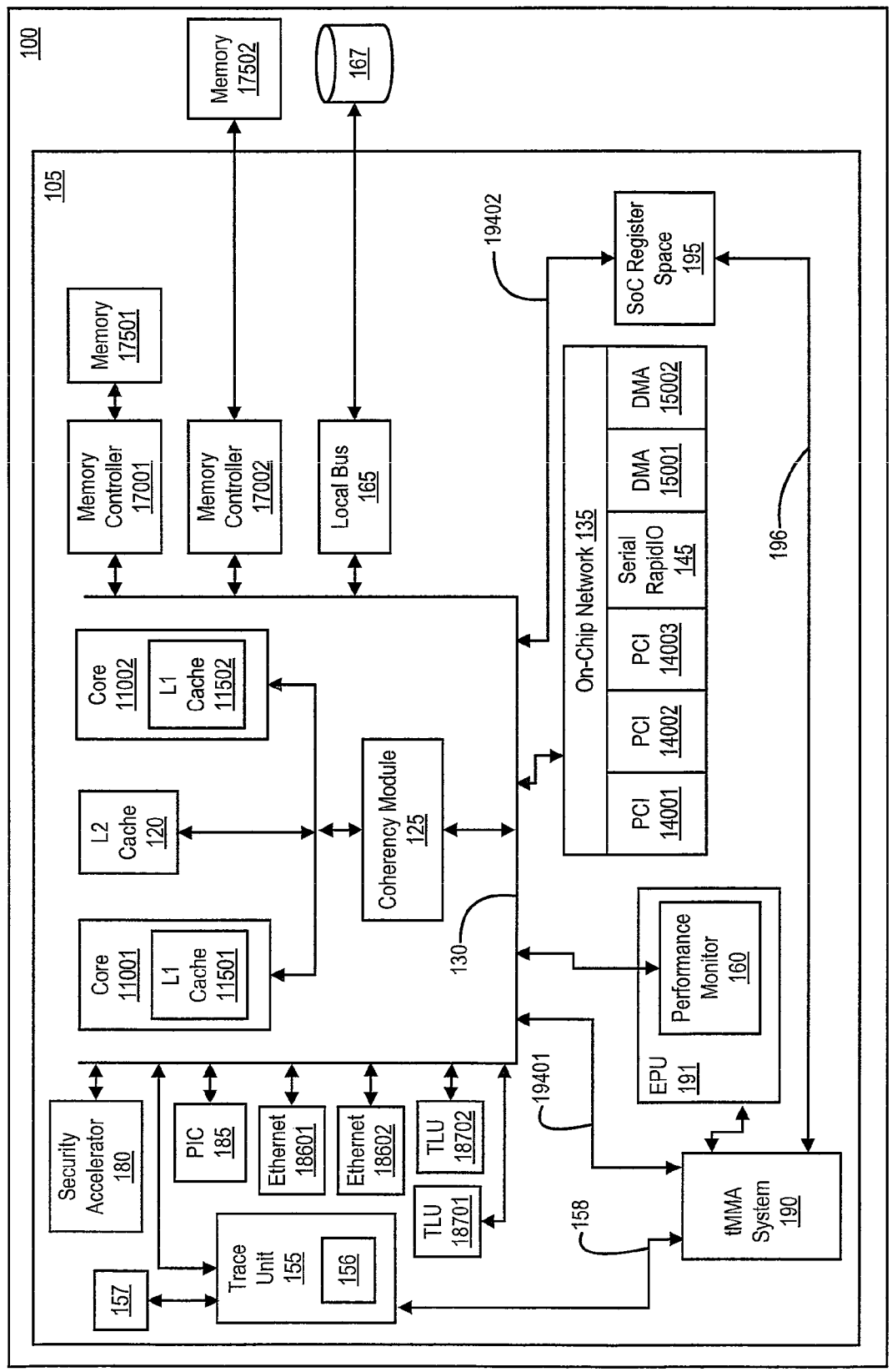
FIG. 1 provides a block diagram of a data processing system configured with a debug/trace unit, according to one or more embodiments.

Turning now to FIG. 1, a block diagram of a data processing system configured with a debug/trace unit is illustrated, according to one or more embodiments. In one or more embodiments, a processor system 100 can include a processing unit 105 (e.g., a chip-level processing unit, an integrated circuit processing unit, a system on chip processing unit, etc.) coupled to a memory 17502. In one or more embodiments, the term "coupled" can include both direct electrical connection between/among elements and indirect electrical connection between/among elements that is achieved with one or more intervening elements. As illustrated, processing unit 105 can include one or more cores 11001 and 11002 that can execute processor instructions of an instruction set architecture (ISA), and cores 11001 and 11002 can include first level caches 11501 and 11502, respectively. In one or more embodiments, each of caches 11501 and 11502 can include separate data and instruction portions or data and instructions can share one or more portions of the cache. Cores 11001 and 11002 can be coupled to a second level cache 120 and a coherency module 125. In one or more embodiments, coherency module 125 can provide and/or maintain coherency across local cacheable memory. In one example, coherency module 125 can provide I/O-initiated transactions to snoop the bus between cores 11001 and 11002 and/or between either of cores 11001 and 11002 and second level cache 120. In a second example, coherency module 125 can provide a flexible switch-type structure that can route and/or dispatch core and I/O initiated transactions to target elements and/or units of processing unit 105. In another example, coherency module 125 can provide a mechanism for any I/O transaction to maintain coherency with a cacheable memory medium, such as memory 17501 and/or 17502, and the local bus memory and/or second level cache 120. As illustrated, coherency module 125 can be coupled to a system bus 130.

In one or more embodiments, processing unit 105 can include an on-chip network 135 coupled to system bus 130. On-chip network 135 can include a multi-port, on-chip, non-blocking crossbar switch fabric. In one or more embodiments, the switch fabric serves to decrease contention and increase bandwidth, and the non-blocking crossbar fabric can allow full-duplex port communication with independent per-port transaction queuing and/or flow control.

In one or more embodiments, processing unit 105 can include one or more peripheral component interconnect (PCI) units 14001-14003 that can be coupled to on-chip network 135. For example, one or more PCI units 14001-14003 can implement a PCI Express interface. For instance, the PCI Express interface can be compliant with a PCI Express Base Specification.

In one or more embodiments, a Serial RapidIO unit 145 can be coupled to on-chip network 135. For example, Serial RapidIO unit 145 can be based on the RapidIO Interconnect Specification, Revision 1.2. RapidIO can include a high-performance, point-to-point, low-pin-count, packet-switched system-level interconnect that can be used in a variety of applications. The RapidIO architecture can provide a variety of features including high data bandwidth, low-latency capability, and support for high-performance I/O devices, as well as providing message-passing and software-managed programming models. Serial RapidIO unit 145 can support multiple inbox/outbox mailboxes (queues) for data and one or more doorbell message structures. Chaining and/or direct modes can be provided for an outbox, and messages can hold multiple packets. In one or more embodiments, Serial RapidIO unit 145 can support I/O and/or message-passing logical specifications, 8-bit and/or 16-bit common transport specifications, and/or the 1×/4× LP-Serial physical layer specification of the RapidIO Interconnect Specification, Revision 1.2.

In one or more embodiments, processing unit 105 can include direct memory access (DMA) engines 15001 and 15002 that can be coupled to on-chip network 135. Each of DMA engines 15001 and 15002 can be capable of transferring blocks of data from any legal address range to any other legal address range. For instance, DMA 15001 can perform DMA transfers between any I/O or memory ports or even between two devices or locations on the same port. In one or more embodiments, each of DMA 15001 and 15002 can include four-channel DMA controllers. For example, the four-channel DMA controllers can allow chaining (extended and/or direct) through local memory-mapped chain descriptors. In one or more embodiments, misaligned transfers can be supported, and capabilities such as stride transfers and complex transaction chaining can be supported.

In one or more embodiments, processing unit 105 can include a performance monitor 160 coupled to system bus 130. Performance monitor 160 can perform counts of events and processor clocks associated with operations such as cache misses, mispredicted branches, etc. In one or more embodiments, performance monitor 160 can monitor, record, and/or output a number of micro operations (micro-ops) completed, a number of branch instructions completed, a number of load micro-ops completed (e.g., vector instructions and/or cache instructions that operate on multiple pieces of data), a number of store micro-ops completed (e.g., vector instructions and cache instructions that operate on multiple pieces of data), a number of fetch redirects, a number of branches finished, a number of branches taken, a percentage of branches taken, a number of finished unconditional branches that miss in a branch-target buffer, statistics and/or information associated with other branch prediction(s)/misprediction (s), a number of pipeline stalls (and for what cause), a number of memory management unit (MMU) translations, a number of MMU translation misses, a number of load/store accesses, a number of level one cache locks, reloads, and/or cast-outs, a number of cycles load/store unit stalls (and for what reason), snoop statistics (e.g., for coherency impacts), interrupt latencies (e.g., a number of cycles an interrupt is pending before being recognized/serviced), level two cache statistics (e.g., hit/miss/allocate/invalidate), floating point unit (FPU) performance information (e.g., stalls, double pumps, etc.), mark conditions (e.g., instruction address compare matches, data address compare matches, etc.), and/or a number of times a specific instruction executes and/or a specific load/store address accessed, among others. In one or more embodiments, performance monitor 160 can help to identify bottlenecks and can improve system performance by monitoring instruction execution and allowing a trace unit to sample its data. In one or more embodiments, a count of an event can be used to trigger a performance monitor event.

In one or more embodiments, processing unit 105 can include a debug/trace unit 155 that can be coupled to system bus 130. Debug/trace unit 155 can interface with various units of processing unit 105 and can gather information regarding state and/or processing associated with the various units of processing unit 105. For example, debug/trace unit 155 can interface with performance monitor 160 and gather information associated with the various units of processing unit 105. In one or more embodiments, debug/trace unit 155 can perform one or more operations without affecting operation of processing system 105.

As shown, debug/trace unit 155 can include a trace interface 156. In one or more embodiments, trace interface 156 can include a Nexus trace interface. For example, trace interface 156 can be compliant with a Nexus standard (e.g., Nexus 5001). In one or more embodiments, trace interface 156 can form and/or output one or more trace messages. For example, trace interface 156 can form and output messages based on events of performance monitor 160. As illustrated, processing unit 105 can include a trace port 157 coupled to debug/trace unit 155. In one or more embodiments, trace port 157 can be compatible with one or more pin interfaces and/or hardware protocols. In one example, trace port 157 can be compatible with a pin interface and/or hardware protocol of IEEE (Institute of Electrical and Electronics Engineers) 1149.1 or JTAG (Joint Test Action Group). For instance, trace port 157 can be coupled to a JTAG debug unit of a computer system. In another example, trace port 157 can be compatible with a Nexus AUX port. In one or more embodiments, trace interface 156 and/or trace port 157 can provide one or more additional pin interfaces and/or hardware protocols and/or augment one or more existing pin interfaces and/or hardware protocols.

In one or more embodiments, processing unit 105 can include a local bus 165 coupled to system bus 130. Local bus 165 can be coupled to external memories, DSPs, ASICs, etc. As shown, processing system 100 can include non-volatile (NV) storage 167 that can be coupled to processor unit 105 via local bus 165.

In one or more embodiments, processor unit 105 can include one or more peripheral memory controllers 17001 and 17002 that can be coupled to system bus 130, and memory controllers 17001 and 17002 can be coupled memories 17501 and 17502, respectively. As illustrated, memory 17501 can be included in processing unit 105, and memory 17502 can be off-part memory of processor system 100. In one or more embodiments, one or more of memories 17501 and 17502 can include DDR SDRAM (double-data-rate synchronous dynamic random access memory). Memories 17501 and 17502 can be considered memory mediums. The term "memory medium" and/or "computer readable storage medium" can include various types of memory and/or storage. For example, memory medium and/or computer readable storage medium can include an installation medium, e.g., a CD-ROM, DVD-ROM, floppy disks, etc., a random access memory or computer system memory (volatile and/or nonvolatile memory) such as DDR SDRAM, DRAM, SRAM, EDO RAM, NVRAM, EPROM, EEPROM, flash memory etc., and/or a non-volatile storage such as a magnetic media, e.g., a hard drive, and/or optical storage. In one or more embodiments, a memory medium and/or computer readable storage medium can include other types of memory and/or storage as well, or combinations thereof. In one or more embodiments, a memory medium and/or computer readable storage medium can be and/or include a product, e.g., a software product, and/or an article of manufacture that includes machine (e.g., processor) executable instructions that implement one or more portions of methods and/or processes described herein.

In one or more embodiments, processing unit 105 can include a security accelerator 180 coupled to system bus 130. Security accelerator 180 can perform security functions, such as key generation and exchange, authentication, and/or bulk encryption from one or more of cores 11001 and 11002. In one or more embodiments, security accelerator 180 can implement and/or perform one or more cryptographic algorithms. For example, one or more cryptographic algorithms can include and/or be associated with IPsec (Internet protocol security), IKE (Internet key exchange), SSL/TLS (secure socket layer/transport layer security), iSCSI (Internet small computer system interface), SRTP (secure real-time transport protocol), IEEE 802.11i, A5/3 for GSM (global system for mobile communications) and EDGE (enhanced data rates for GSM evolution), and/or GEA3 for GPRS (general packet radio service), among others.

In one or more embodiments, processing unit 105 can include a programmable interrupt controller (PIC) 185 coupled to system bus 130. For example, PIC 185 can implement logic and/or programming structures of the OpenPIC architecture, providing for external interrupts (with fully nested interrupt delivery), message interrupts, internal-logic driven interrupts, and/or global high-resolution timers. For instance, a number of programmable interrupt priority levels are supported. In one or more embodiments, inter-processor interrupt (IPI) communication can allow one core to interrupt another core or either core to interrupt itself. In one or more embodiments, PIC 185 can be bypassed in favor of an external interrupt controller.

In one or more embodiments, processing unit 105 can include one or more Ethernet controllers/interfaces 18601 and 18602 coupled to system bus 130. Each of Ethernet controllers/interfaces 18601 and 18602 can incorporate a media access control (MAC) sublayer that can support 10 and 100 Mbps and 1 Gbps Ethernet/IEEE 802.3 networks with MII (Media Independent Interface), RMII (Reduced Media Independent Interface), GMII (Gigabit Media Independent Interface), RGMII (Reduced Gigabit Media Independent Interface), TBI (Ten Bit Interface), and/or RTBI (Reduced Ten Bit Interface) physical interfaces, among others, for example.

In one or more embodiments, processing unit 105 can include one or more table lookup units (TLUs) 18701 and 18702 coupled to system bus 130. Each of TLUs 18701 and 18702 can support several types of table lookup algorithms and/or provide resources for generation of table entry addresses in memory, hash generation of addresses, and/or binary table searching algorithms for exact-match and/or longest-prefix match strategies. Each table lookup unit (TLU) can allow an implementation of a variety of table lookup algorithms for different applications. Each TLU can include multiple physical tables, where each table can include an associated configuration register including a physical table with a base table address configurable by software.

In one or more embodiments, processing unit 105 can include an event processing unit (EPU) 191, a triggered memory map access (tMMA) system 190, and a SoC register space 195. As shown, tMMA system 190 can be coupled to trace unit 155 through a trace message bus 158, can be coupled to system bus 130 through a SoC bus 1901, and can be coupled to SoC register space 195 through a debug bus 196, and SoC register space 195 can be coupled to system bus 130 through a SoC bus 1902. In one or more embodiments, tMMA system 190 can monitor any addressable portion of processing system 100 and/or processing unit 105. For example, tMMA system 190 can use a memory map to read data from and/or send data to any addressable portion of processing system 100 and/or processing unit 105, and the memory map can be accessed through one or more addresses of the memory map. For instance, one or more elements of processing system 100 and/or processing unit 105 can include addressable portions that can be access through the memory map.

As shown, EPU 191 can include performance monitor 160 and can be coupled to tMMA system 190. In one or more embodiments, EPU 191 can receive one or more events (e.g., debug events) of processing system 100 and/or processing unit 105 and send one or more triggers to tMMA system 190. For example, a trigger can be based on and/or associated with a respective event. In one or more embodiments, an event can include a change of a counter (e.g., a counter of performance monitor 160), a watchpoint, and/or a complex event, among others. In one or more embodiments, a complex event can include two or more counters (e.g., two or more counters of performance monitor 160). In one example, a complex event can include a result of a function that utilizes two or more counters. For instance, the function can include one or more logical operators (e.g., one or more of AND, OR, XOR, NAND, NOR, etc.). In another example, anything monitored and/or recorded by performance monitor 160 can be utilized in an event and/or utilized to generate a trigger. In one or more embodiments, EPU 191 can be utilized as an on-chip logic analyzer. In one or more embodiments, an event can be received from a source external to processing system 100 and/or processing unit 105. For example, an external computer system and/or an external debug/trace tool can generate an event. For instance, a user can utilize an external computer system and/or an external debug/trace tool to generate an event.

In one or more embodiments, tMMA system 190 can perform one or more actions based on and/or associated with a received trigger. For example, tMMA system 190 can perform one or more transactions of one or more types of transactions. For instance, types of transactions can include a write to a an address of the memory map, a read from an address of the memory map, a read followed by write from/to two respective addresses of the memory map, and/or a fetch transaction. For example, writing to an address of the memory map can be utilized to program or reprogram a device while the device is in operation. For instance, the device does not have to complete a set of instructions and/or does not have to be restarted to be reconfigured by tMMA system 190. In one or more embodiments, a transaction can be atomic. In one or more embodiments, a result of a transaction (e.g., data read, data written, error, etc.) can be used in generating a trace message and/or be transmitted to EPU 191. In one example, tMMA system 190 can generate a trace message that includes the result of the transaction and send the trace message to trace unit 155. In another example, the result can be utilized by EPU 191 to produce one or more triggers. In one instance instance, the result can be used in a sequence of triggers that EPU 191 can send to tMMA system 190. In another instance, the result can be utilized by EPU 191 is a same or similar fashion as EPU 191 utilizes data from performance monitor 160.

Figure 2:
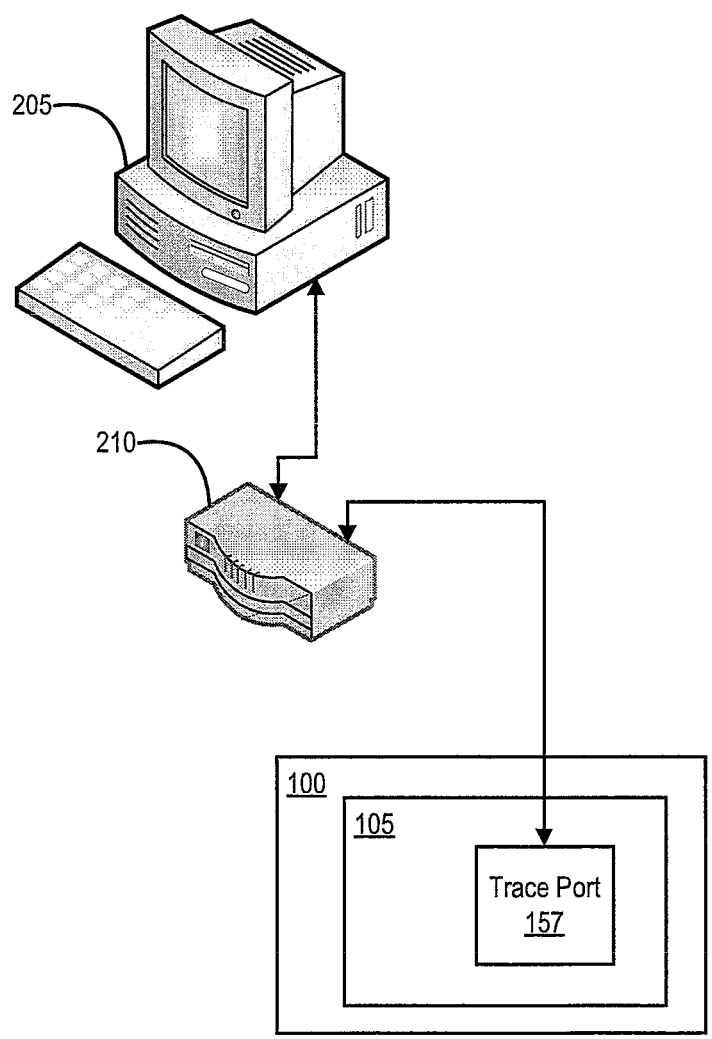
FIG. 2 provides an exemplary trace setup, according to one or more embodiments.

Turning now to FIG. 2, a trace setup is illustrated, according to one or more embodiments. As shown, processing system 100 can be coupled to a debug/trace unit 210, and debug/trace unit 210 can be coupled to a computer system 205. In one or more embodiments, debug/trace unit 210 can receive one or more trace messages formed by trace interface 156, and the trace messages can be conveyed via one or more packets of data through trace port 157 to debug/trace unit 210. In one or more embodiments, debug/trace unit 210 can be external to computer system 205 (as shown), or debug/trace unit 210 can be included in computer system 205 (not shown).

In one or more embodiments, computer system 205 can include a processor (not shown) coupled to a memory medium (not shown), where the processor can execute program instructions from the memory medium to perform various functions, such as interfacing with trace unit 210 and a human being. For example, computer system 205 can include human interface devices such as an output device, e.g., a display, and an input device, e.g., a keyboard. Computer system 205 can include or be coupled to other devices, such as a mouse, one or more speakers, a printer, a track ball, and/or a microphone, among others.

Figure 3:
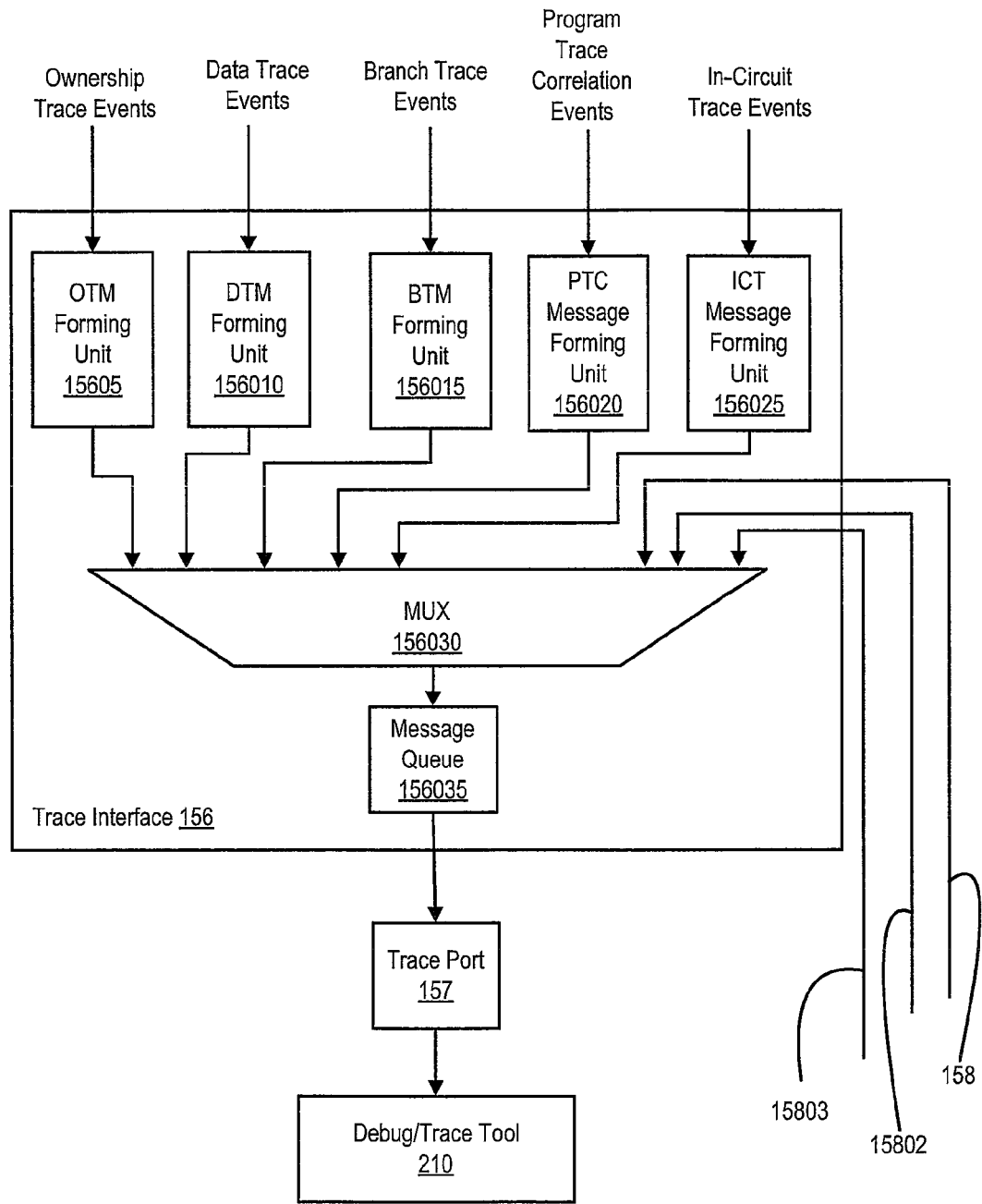
FIG. 3 provides a block diagram that provides further detail of a trace interface, according to one or more embodiments.

Turning now to FIG. 3, a block diagram is illustrated that provides further detail of trace interface 156, according to one or more embodiments. As illustrated, trace interface 156 can include message forming units 15605-156025, a multiplexer (MUX) 156030, and a message queue 156035. As shown, multiple trace streams can be processed in parallel by trace interface 156, which can form trace messages responsive to trace events.

As illustrated, one or more trace message inputs of MUX 156030 can be selected to provide messages at an output of MUX 156030. In one or more embodiments, messages provided at the one or more outputs of MUX 156030 can be provided to message queue 156035, which can determine whether the messages are to be transmitted in real-time or stored for later transmission. For instance, messages that are to be transmitted to the debug/trace tool 210 can be provided to trace port 157, which is coupled to the debug/trace tool 210. In one or more embodiments, one or more messages can be transmitted to trace port 157 in real-time. For example, each of the one or more messages can be transmitted to trace port 157 no later than an amount of time transpiring and/or by an operational deadline.

In one or more embodiments, when an ownership trace event occurs, ownership trace message (OTM) forming unit 15605 can form an OTM and can provide the OTM to an associated one of the inputs of MUX 156030. The OTM can be periodically formed or formed in response to a processor identification (PID) register change. In one or more embodiments, the OTM may be useful when employed with embedded processors having memory management units (MMUs).

When the OTM is periodically sent, the OTM can include all PIDs defined for a current thread. When the OTM is sent when a PID register changes, the OTM may only include the PID register that changed to reduce bandwidth. To support either scenario, a variable length process field may be implemented in the OTM. The process field may include a PID enumeration (PID_ENUM) section followed by a fixed length PID section. If a PID_ENUM bit of an associated PID is set, then the PID is included in the packet. If the PID_ENUM bit is not set, then the PID is not included in the packet. In one or more embodiments, a four bit PID_ENUM section is provided to support up to four 16-bit PIDs. Similarly, when a data trace event occurs, data trace message (DTM) forming unit 156010 can form a DTM and can provide the DTM to an associated one of the inputs of MUX 156030.

In one or more embodiments, when a branch trace event occurs, a branch trace message (BTM) forming unit 156015 can form a BTM and can provide the BTM to an associated one of the inputs of MUX 156030. In one example, the BTM can include branch history message (BHM) that identifies a thread switch in a branch type (B-TYPE) field. In another example, the BTM can include a BHM that identifies a return from a subroutine. For instance, the BHM can identify a branch to link instruction (e.g., an indirect branch instruction) that can be used as a return or exit from a subroutine.

In one or more embodiments, when a program trace correlation (PTC) event occurs, a PTC message forming unit 156020 can form a PTC message and can provide the PTC message to an associated one of the inputs of MUX 156030. In one or more embodiments, an event code (EVCODE) field of the PTC message can be formed in response to an event that indicated that a branch and link instruction is detected. For instance, debug/trace unit 155 may detect the branch and link instruction. In one or more embodiments, an EVCODE field of the PTC message can identify a branch and link event that can be used to identify a call to a subroutine. For example, the PTC message can debug/trace tool 210 and/or computer system 205 to correlate watchpoint or performance events to a program trace of an associated subroutine. As shown in Table 1, the PTC message can include the EVCODE field that can be modified to indicate one or more events, such as a thread switch, a branch and link event, etc. Other packets of the PTC message are described in Table 1, as well.

In one or more embodiments, an EVCODE field of the PTC message can identify a thread switch. The PTC message allows debug/trace tool 210 and/or computer system 205 to, for example, correlate watchpoint or performance events to a program trace of an associated thread.

TABLE 1

| Minimum Packet Size (bits) | Packet Name | Packet Type | Description |
| --- | --- | --- | --- |
| 0 | TSTAMP | Vendor-variable | Number of cycles message was held in the buffer or the full timestamp value. |
| 0 | CDATA | Vendor-variable | This packet is a vendor-defined field. It can represent a value used in correlating an event with program flow (e.g., branch history). |
| 1 | I-CNT | Variable | Number of instruction units executed since the last taken branch. |
| 0 | EVCODE | Vendor-fixed | Event Code. Refer to |

TABLE 1-continued

| Minimum Packet Size (bits) | Packet Name | Packet Type | Description |
|---|---|---|---|
| 0 | SRC | Vendor-fixed | Table 2. Client that is source of message. |
| 6 | TCODE | Fixed | Value = 33 |

As shown in Table 2 below, EVCODE of the PTC message can indicate various events. In one or more embodiments, the EVCODE of the PTC message can indicate that a branch occurred in one of cores 11001 and 11002. In one example, the EVCODE of the PTC message can indicate that a branch and link instruction occurred in one of cores 11001 and 11002, and the PTC message can include 1010 as EVCODE to indicate that the branch and link instruction occurred in one of cores 11001 and 11002. In a second example, the EVCODE of the PTC message can indicate that a direct branch instruction occurred in one of cores 11001 and 11002, and the PTC message can include 1011 as EVCODE to indicate that the direct branch instruction occurred in one of cores 11001 and 11002. In another example, the EVCODE of the PTC message can indicate that a branch to link instruction occurred in one of cores 11001 and 11002, and the PTC message can include 1100 as EVCODE to indicate that the branch to link instruction occurred in one of cores 11001 and 11002.

TABLE 2

| Event Code (EVCODE) | Event Description |
|---|---|
| 0000 | Entry into debug mode |
| 0001 | Entry into low-power mode |
| 0010 | Data Trace - Write |
| 0011 | Data Trace - Read |
| 0100 | Program Trace Disabled |
| 0101-0111 | Reserved for future functionality |
| 1010 | Branch and Link Occurrence |
| 1011 | Direct Branch Occurrence |
| 1100 | Branch to Link Occurrence |
| 1101 | Thread Switch |
| 1110 | tMMA |

In one or more embodiments, each of the trace events can provide an associated thread identification (ID) and a core ID (if applicable) to an appropriate message forming unit. In one or more embodiments, a thread and a core ID can be concatenated in a single source (SRC) field of a message. In one or more embodiments, when an in-circuit trace (ICT) event occurs, ICT message forming unit 156025 can form an ICT message and can provide the ICT message an associated one of the inputs of MUX 156030. The ICT message can be formed responsive to an inter-thread communication or a shared memory access, among others. An in-circuit event that corresponds to, for example, a core register access, a key circuit debug signal, a watchpoint event, or a performance event can be reported in the ICT message. In one or more embodiments, other events and messages (e.g., Nexus events and messages) not specifically described herein may be referred to as ICT events and messages, and ICT forming unit 156030 can responds to these events and form messages that correspond to those events.

In one or more embodiments, trace interface 156 can receive one or more trace messages from tMMA system 190 via trace message bus 158 and can provide the one or more traces messages from tMMA system 190 to an associated one of the inputs of MUX 156030. In one or more embodiments, trace interface 156 can receive one or more trace messages from one or more elements of processing unit 105 via a trace message bus and can provide the one or more traces messages from the one or more elements of processing unit 105 to associated one or more of the inputs of MUX 156030. In one example, trace interface 156 can receive one or more trace messages from core 11001 via a trace message bus 15802 and can provide the one or more traces messages from core 11001 to an associated one of the inputs of MUX 156030. In another example, trace interface 156 can receive one or more trace messages from coherency unit 125 via trace message bus 15803 and can provide the one or more traces messages from coherency unit 125 to an associated one of the inputs of MUX 156030. In one or more embodiments, tMMA system 190 can form one or more messages and the one or more messages can be transmitted to trace port 157 in real-time. For example, each of the one or more messages can be transmitted to trace port 157 no later than an amount of time transpiring and/or by an operational deadline. For instance, the one or more messages can be formed by tMMA system 190 and can available to debug/trace tool 210 and/or computer system 205 in real-time.

Figure 4:
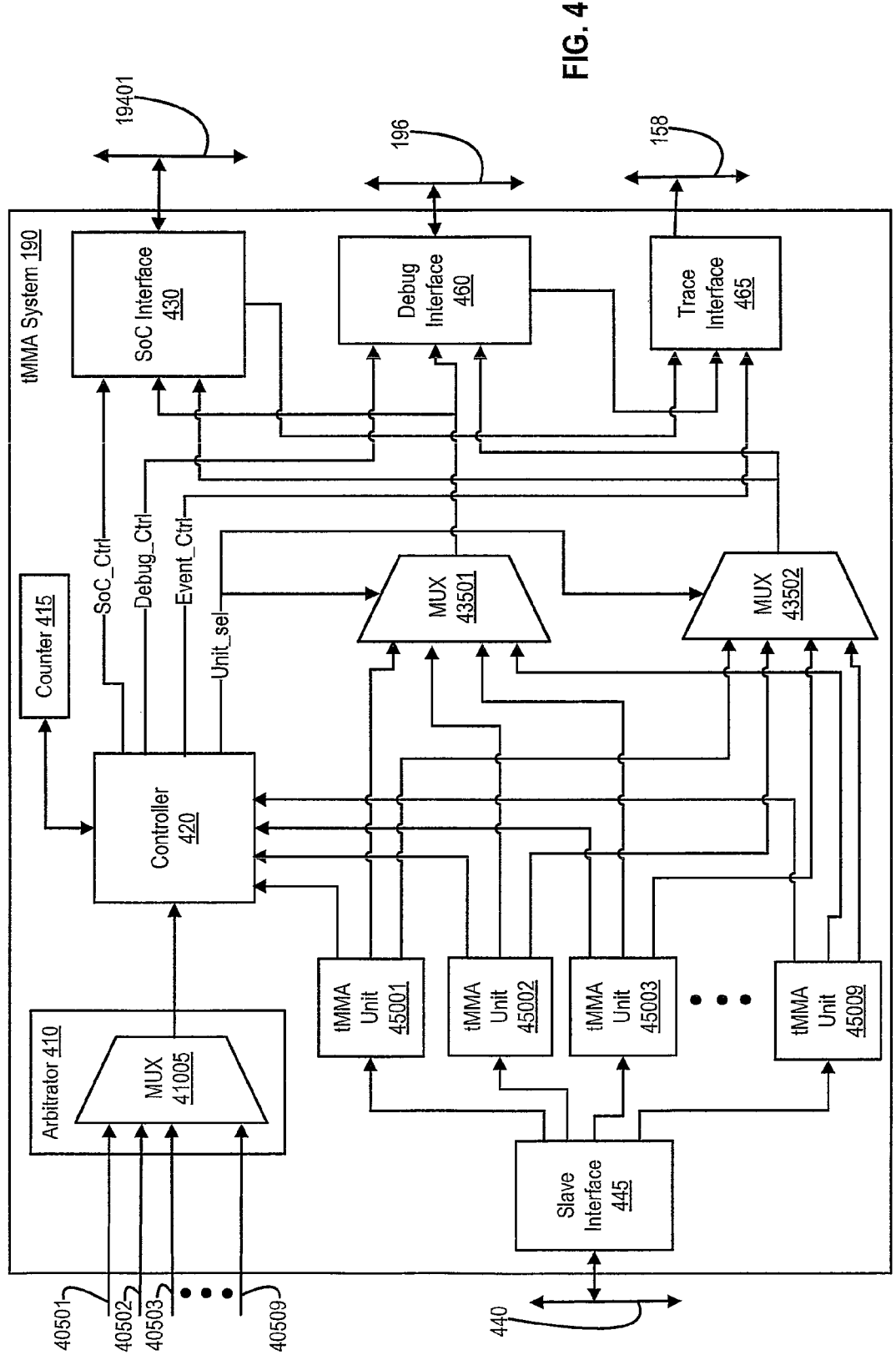
FIG. 4 provides a block diagram that provides further detail of a trigger memory mapped access system, according to one or more embodiments.

Turning now to FIG. 4, a block diagram that provides further detail of a tMMA system is illustrated, according to one or more embodiments. In one or more embodiments, tMMA 190 can receive one or more triggers 40501-40509 via an arbitrator 410. For example, the one or more triggers 40501-40509 can include one or more triggers from EPU 191. In one or more embodiments, any number of triggers can be utilized for an implementation. As shown, tMMA 190 can include arbitrator 410 which can be coupled to a controller 420 of tMMA 190, and arbitrator 410 can provide one or more selected triggers to controller 420. As illustrated, arbitrator 410 can include a MUX 41005 to provide one or more selected triggers to controller 420, where trigger inputs of MUX 41005 can be selected to provide triggers at an output of MUX 41005 that can be provided to controller 420. As shown, tMMA 190 can include a counter coupled to controller 420, and controller 420 can be coupled to a SoC interface 430, a debug interface 460, and multiplexers (MUXes) 43501 and 43502 which can be included in tMMA 190. MUXes 43501 and 43502 can be coupled to a trace interface 465 that can be included in tMMA 190 and can be coupled to debug interface 460 and SoC interface 430. In one or more embodiments, SoC interface 430 and/or debug interface 460 can include one or more functionalities of and/or be a memory mapped access bus.

As illustrated, SoC interface 430, debug interface 460, and trace interface 465 can be coupled respectively to SoC bus 1901, debug bus 196, and trace message bus 158. As shown, tMMA 190 can include a slave interface 445 coupled to a slave bus 440, and tMMA 190 can include one or more tMMA units 45001-45009 coupled to slave interface 445, controller 420, and MUXes 43501 and 43502, as illustrated. In one or more embodiments, any number of tMMA units can be utilized for an implementation. In one or more embodiments, a number of triggers can equal a number of tMMA units. For example, each of tMMA units 45001-45009 can correspond to a respective trigger of triggers 40501-40509. For instance, when a trigger is asserted, the respective tMMA unit of the trigger can perform one or more transactions utilizing one or more buses. As shown, tMMA 190 can include a trace interface 465 coupled to controller 420, SoC interface 430, debug interface 460, and trace message bus 158. In one or more embodiments, trace interface 465 can generate and/or form one or more trace messages and send the one or more trace messages to trace message bus 158.

Figure 5A:
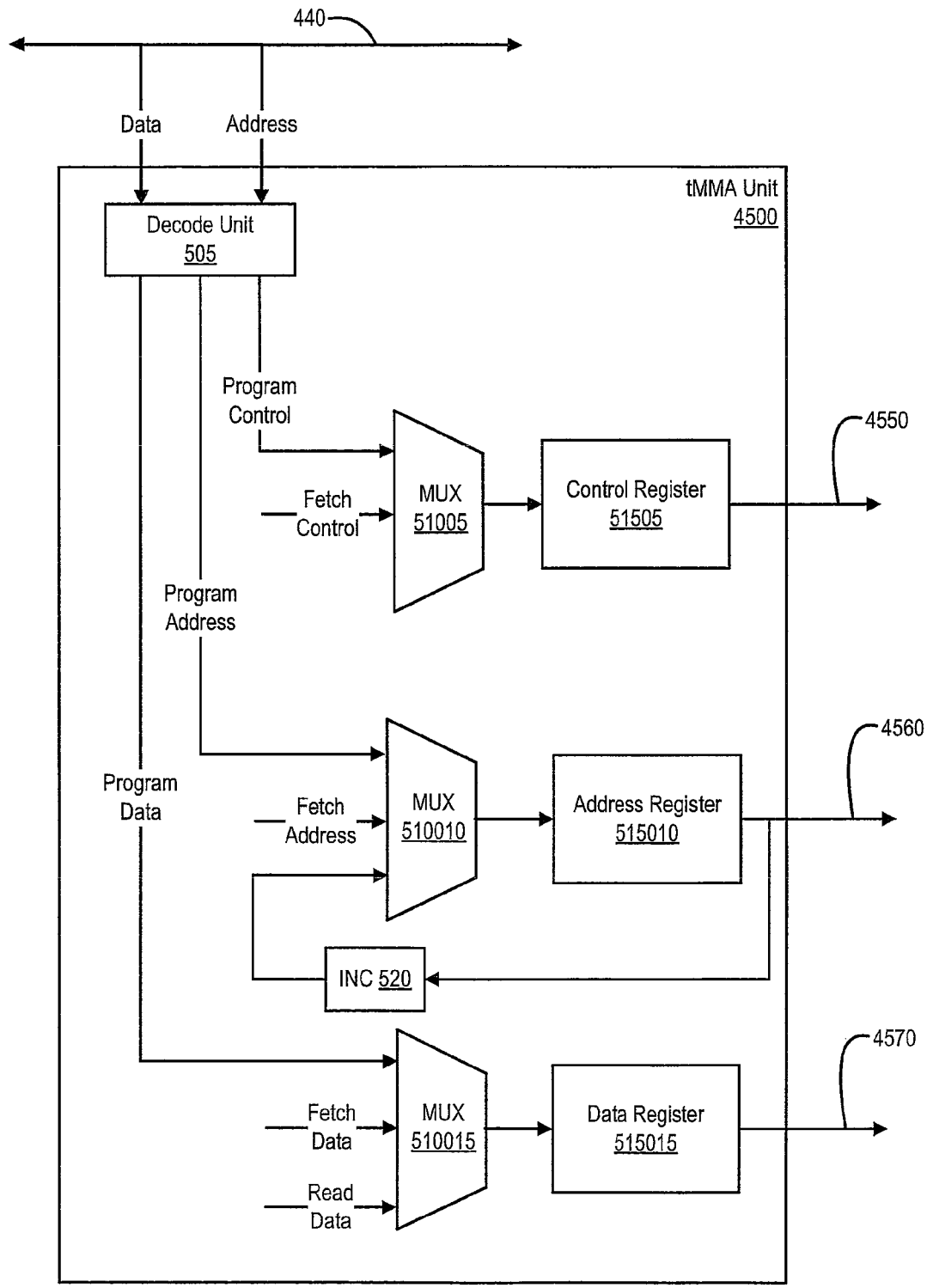
FIG. 5A provides a block diagram that provides further detail of a trigger memory mapped access unit, according to one or more embodiments.

Turning now to FIG. 5A, a block diagram that provides further detail of a tMMA unit is illustrated, according to one or more embodiments. In one or more embodiments, a triggered memory map access (tMMA) unit 4500 can include a decode unit 505, MUXes 51005-510015, a control register 51505, an address register 515010, a data register 515015, and a auto-increment/auto-decrement unit (INC) 520. In one or more embodiments, INC 520 can allow a single asserted trigger to perform an action on multiple addresses of a memory map. In one or more embodiments, data register 515015 can include storage of a word (e.g., 32-bits) and/or address register 515010 can include storage of a double-word (e.g., 64-bits).

As illustrated, decode unit 505 can be coupled to MUXes 51005-510015 which can be coupled to respective registers 51505-515015. INC 520 can be coupled to address register 515010 and MUX 510010, as shown. In one or more embodiments, tMMA unit 4500 can represent a tMMA unit of tMMA units 45001-45009. As shown, tMMA unit 4500 can provide outputs 4550, 4560, and 4570 from control register 51505, address register 515010, and 515015, respectively. In one or more embodiments, outputs 4550, 4560, and 4570 can be coupled to controller 420, MUX 43501, and MUX 43502, respectively.

Figure 5B:
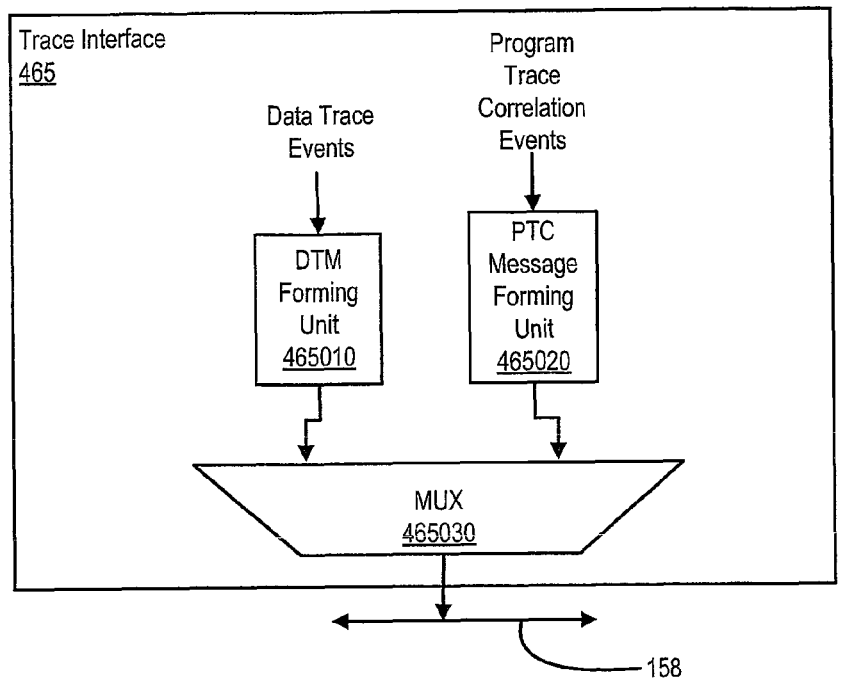
FIG. 5B provides a block diagram that provides further detail of a trace interface of a trigger memory mapped access system, according to one or more embodiments.

Turning now to FIG. 5B, a block diagram that provides further detail of a trace interface of a tMMA system is illustrated, according to one or more embodiments. In one or more embodiments, a trace interface of a tMMA system can generate one or more trace events and can form one or more trace messages corresponding to the one or more trace events. As illustrated, trace interface 465 can include a DTM forming unit 465010 and a PTC message forming unit 465020 coupled to a MUX 465030. In one or more embodiments, DTM forming unit 465010, PTC message forming unit 465020, and MUX 465030 can include one or more structures and/or functionalities described above with reference to respective DTM forming unit 156010, PTC message forming unit 156020, and MUX 156030. As shown, an output of MUX 465030 can be coupled to trace message bus 158.

Figure 6A:
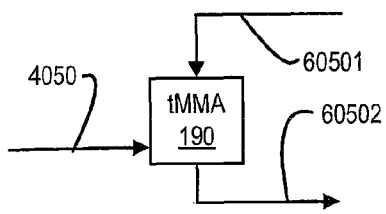
FIGS. 6A-6D provide block diagrams of a trigger memory mapped access system with various input buses and/or output buses, according to one or more embodiments.

Turning now to FIGS. 6A-6D, block diagrams of a tMMA unit with various input buses and/or output buses are illustrated, according to one or more embodiments. As illustrated in FIG. 6A, tMMA system 190 can receive a trigger 4050 (e.g., a trigger of triggers 40501-40509), can receive data from bus 60501, and can output data to bus 60502. Table 3 illustrates possibilities for bus combinations/variations that can be used with reference to FIG. 6A.

TABLE 3

| Bus 60501 | Bus 60502 |
| --- | --- |
| SoC bus | SoC Bus |
| SoC bus | Debug Bus |
| SoC bus | Trace Bus |
| Debug Bus | SoC Bus |
| Debug Bus | Debug Bus |
| Debug Bus | Trace Bus |
| Trace Bus | SoC Bus |
| Trace Bus | Debug Bus |
| Trace Bus | Trace Bus |

In one or more embodiments, a trace bus can include a bus (not specifically shown) coupled to trace port 157. For example, the trace bus can receive data from debug/trace tool 210 and/or computer system 205. For instance, the trace bus can be included in a portion of a memory map, and a tMMA unit can send and/or receive data to and/or from debug/trace tool 210 and/or computer system 205 utilizing the memory map.

Figure 6B:
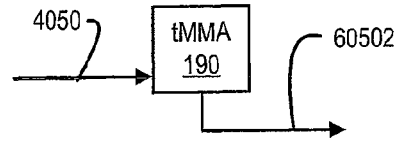

As illustrated in FIG. 6B, tMMA system 190 can receive trigger 4050 and output data on bus 60502 which can include a bus of a SoC bus, a debug bus, or a trace bus. In one or more embodiments, tMMA 190 can store data and send the data to bus 60502 based on trigger 4050.

Figure 6C:
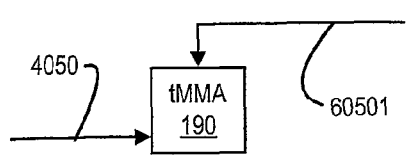

As illustrated in FIG. 6C, tMMA system 190 can receive trigger 4050 and data from bus 60501 which can include a bus of a SoC bus, a debug bus, a trace bus. In one or more embodiments, tMMA system 190 can receive and/or store data from bus 60502 based on trigger 4050.

Figure 6D:
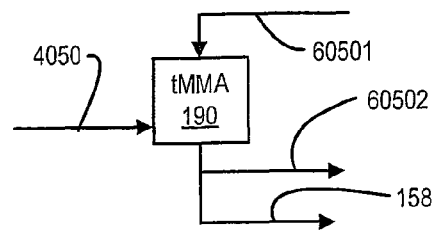

As illustrated in FIG. 6D, tMMA system 190 can receive trigger 4050, can receive data from bus 60501, can output data to bus 60502, and can output trace messages on trace message bus 158. Table 4 illustrates possibilities for bus combinations/variations that can be used with reference to FIG. 6D.

TABLE 4

| Bus 60501 | Bus 60502 |
| --- | --- |
| SoC bus | SoC Bus |
| SoC bus | Debug Bus |
| Debug Bus | SoC Bus |
| Debug Bus | Debug Bus |
| Trace Bus | SoC Bus |
| Trace Bus | Debug Bus |

In one or more embodiments, tMMA system 190 can be considered intrusive or non-intrusive. In one example, tMMA system 190 can be considered intrusive by interacting with a SoC bus. For instance, tMMA system 190 can be considered intrusive by interacting with a core (e.g., core 11001 or 11002) using SoC bus 19401. In another example, tMMA system can be considered non-intrusive by interacting with debug bus 196. In one instance, tMMA system 190 can be considered non-intrusive by interacting with a core (e.g., core 11001 or 11002) using debug bus 196 (e.g., using associated debug and/or trace logic). In another instance, all interactions of tMMA system 190 can be non-intrusive by interacting with processing system 100 and/or processing unit 105 using debug bus 196. In one or more embodiments, when tMMA system 190 is considered to be non-intrusive, processing system 100 and/or processing unit 105 can perform as if tMMA system 190 were absent or not in operation.

In one or more embodiments, tMMA system 190 access to a memory map can be considered coherent or non-coherent. In one example, coherent access can include using and/or accessing cacheable memory. For instance, coherent access can include using and/or accessing memory addresses that can be managed by coherency module 125. In a second example, coherent access can include using and/or accessing a SoC bus. In another example, non-coherent access can include using a debug bus. For instance, tMMA system 190 can use debug bus 196 to access SoC register space, and this access can be considered non-coherent.

Figure 7:
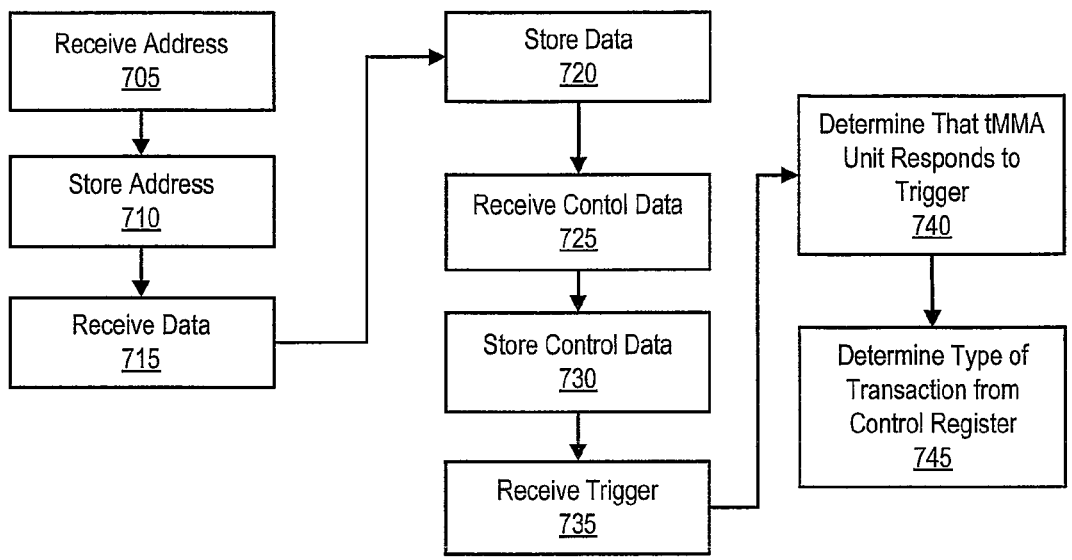
FIG. 7 provides a method that can be used in operation a trigger memory mapped access system, according to one or more embodiments.

Turning now to FIG. 7, a method that can be used in operation a tMMA system is illustrated, according to one or more embodiments. At 705, an address can be received. For example, tMMA unit 4500 can receive the address. For instance, tMMA unit 4500 can receive the address via slave bus 440. At 710, the address can be stored. For example, the address can be stored in address register 515010. At 715, data can be received. For example, tMMA unit 4500 can receive the data. For instance, tMMA unit 4500 can receive the data via slave bus 440. At 720, the data can be stored. For example, the data can be stored in data register 515015. At 725, control data can be received. For example, tMMA unit 4500 can receive the control data. For instance, tMMA unit 4500 can receive the control data via slave bus 440. At 730, the control data can be stored. For example, the control data can be stored in control register 51505. At 735, a trigger can be received. For instance, tMMA 4500 can receive the trigger. At 740, it can be determined that tMMA 4500 responds to the trigger. In one or more embodiments, the control data stored in control register 51505 can be used to determine that tMMA 4500 responds to the trigger. For example, one or more bits of control register 51505 can be used in a comparison to determine that tMMA 4500 responds to the trigger. At 745, a type of transaction can be determined. For example, the control data stored in control register 51505 can be used to determine the type of transaction. In one or more embodiments, the transaction can include a transaction of a write transaction, a read transaction, a read followed by write transaction, and a memory fetch transaction. In one or more examples, the transaction can include a SoC transaction and/or a debug transaction. For instance, the SoC transaction can include a transaction involving a SoC bus, and/or the debug transaction can include a transaction involving a debug bus.

Figure 8:
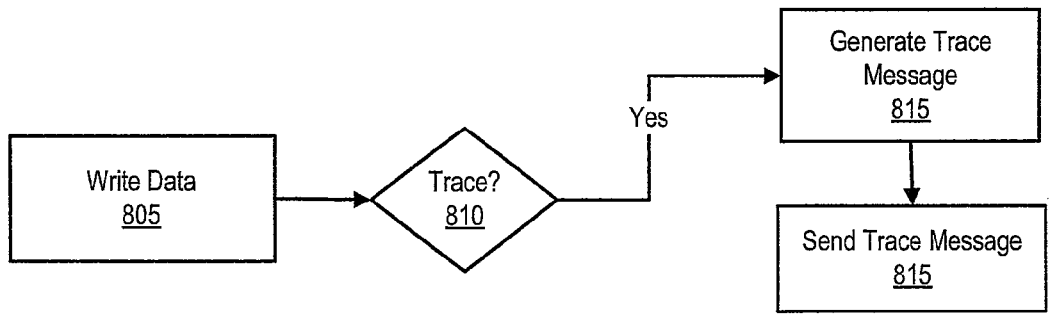
FIG. 8 provides a method that can be used in operation a trigger memory mapped access system in performing a write transaction, according to one or more embodiments.

Turning now to FIG. 8, a method that can be used in operation a tMMA system in performing a write transaction is illustrated, according to one or more embodiments. At 805, data can be written to a memory map. For example, tMMA unit 4500 can write the data stored in data register 515015 to the memory map. For instance, tMMA unit 4500 can write the data stored in data register 515015 to the address stored in address register 515010, where the address stored in address register 515010 is an address of the memory map. At 810, it can be determined whether or not to perform a trace based on the trigger and/or an action in response to the trigger. If it is determined to perform the trace, a trace message can be generated at 815, and the trace message can be sent at 820. In one or more embodiments, trace interface 465 can generate the trace message that can include the data stored in data register 515015 and send the trace message to trace unit 155 via trace message bus 158. For example, the trace message can be a Nexus trace message. For instance, the Nexus trace message can include or be a DTM (e.g., data trace—data write message).

Figure 9:
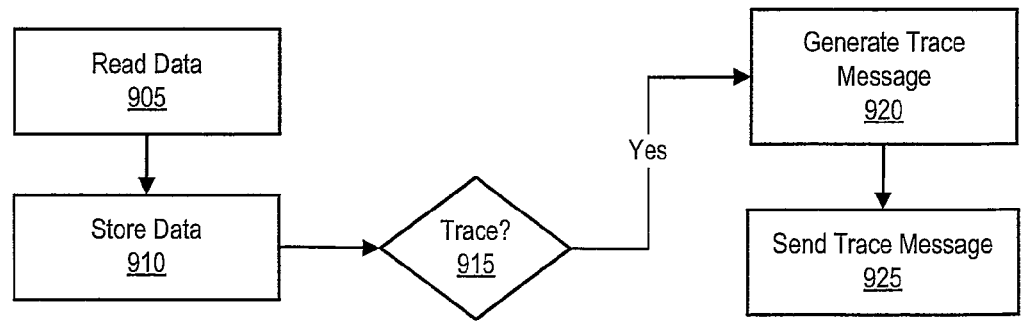
FIG. 9 provides a method that can be used in operation a trigger memory mapped access system in performing a read transaction, according to one or more embodiments.

Turning now to FIG. 9, a method that can be used in operation a tMMA system in performing a read transaction is illustrated, according to one or more embodiments. At 905, data can be read from a memory map. For example, tMMA unit 4500 can read data available through the memory map. For instance, tMMA unit 4500 can read data available at the address stored in address register 515010, where the address stored in address register 515010 is an address of the memory map. At 910, the data read from the memory map can be stored. For example, the data read from the memory map can be stored in data register 515015. At 915, it can be determined whether or not to perform a trace based on the trigger and/or an action in response to the trigger. If it is determined to perform the trace, a trace message can be generated at 920, and the trace message can be sent at 925. In one or more embodiments, trace interface 465 can generate the trace message that includes the data stored in data register 515015 and send the trace message to trace unit 155 via trace message bus 158. For example, the trace message can be a Nexus trace message. For instance, the Nexus trace message can include or be a DTM (e.g., data trace—data read message).

Figure 10:
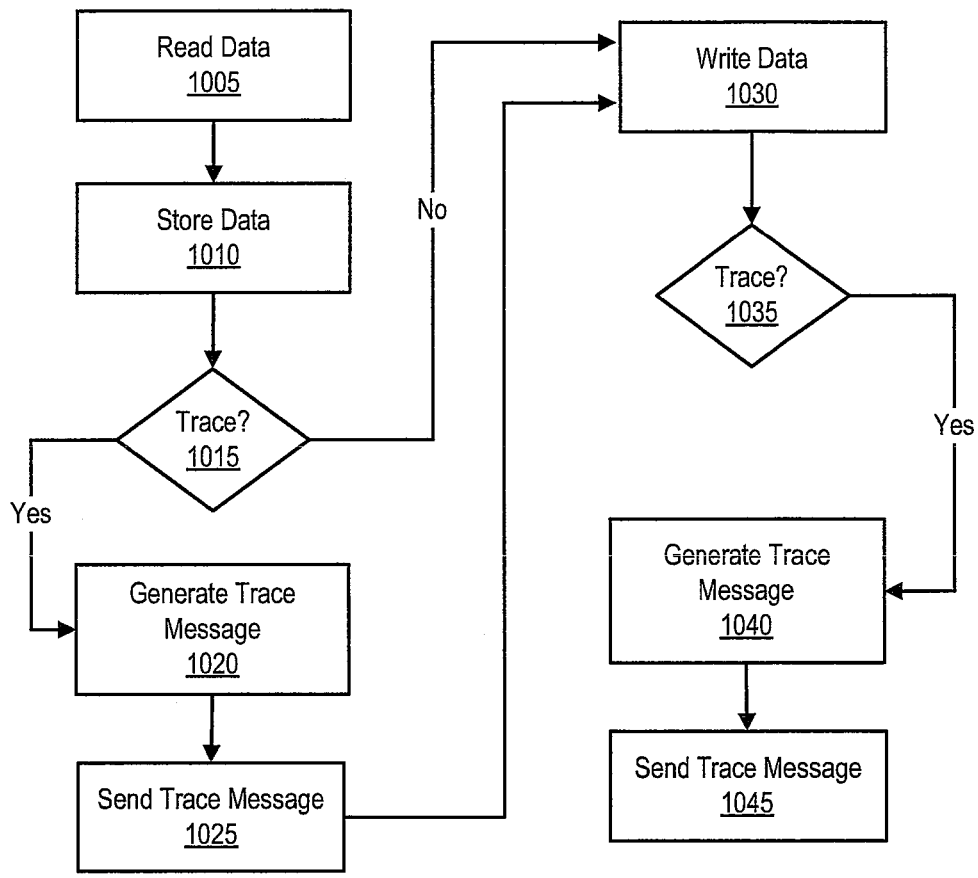
FIG. 10 provides a method that can be used in operation a trigger memory mapped access system in performing a read followed by write transaction, according to one or more embodiments.

Turning now to FIG. 10, a method that can be used in operation a tMMA system in performing a read followed by write transaction is illustrated, according to one or more embodiments. In one or more embodiments, two or more tMMA units 45001-45009 can be utilized in performing a transaction. At 1005, data can be read from a memory map. For example, tMMA unit 45001 can read data available through the memory map. For instance, tMMA unit 45001 can read data available at the address stored in the address register of tMMA unit 45001, where the address stored in the address register of tMMA unit is an address of the memory map. At 1010, the data read from the memory map can be stored. For example, the data read from the memory map can be stored in the data register of tMMA 45001. At 1015, it can be determined whether or not to perform a trace based on the trigger and/or an action in response to the trigger. If it is determined not to perform the trace, the method can proceed to 1030. If it is determined to perform the trace, a trace message, that can include the data stored in the data register of tMMA 45001, can be generated at 1020, and the trace message can be sent at 1025. In one or more embodiments, trace interface 465 can generate the trace message and send the trace message to trace unit 155 via trace message bus 158. For example, the trace message can be a Nexus trace message. For instance, the Nexus trace message can include or be a DTM (e.g., data trace—data read message).

At 1030, data can be written to the memory map. For example, tMMA unit 45002 can write the data stored in the data register of tMMA 45002 to the memory map. For instance, tMMA unit 45002 can write the data stored in the data register of tMMA 45002 to the address stored in the address register of tMMA 45002, where the address stored in the address register of tMMA 45002 is an address of the memory map. At 1035, it can be determined whether or not to perform a trace based on the trigger and/or an action in response to the trigger. If it is determined to perform the trace, a trace message can be generated at 1040, and the trace message can be sent at 1045. In one or more embodiments, trace interface 465 can generate the trace message, that can include the data stored in the data register of tMMA 45002, and send the trace message to trace unit 155 via trace message bus 158. For example, the trace message can be a Nexus trace message. For instance, the Nexus message can include or be a DTM (e.g., data trace—data write message).

Figure 11:
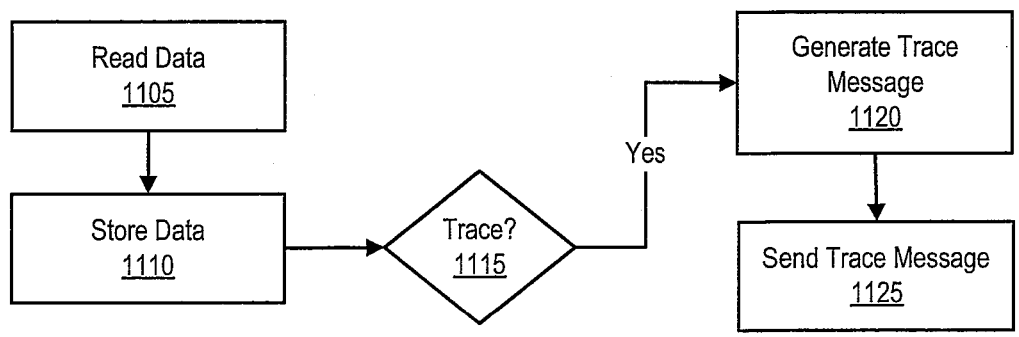
FIG. 11 provides a method that can be used in operation a rigger memory mapped access system in performing a fetch transaction, according to one or more embodiments.

Turning now to FIG. 11, a method that can be used in operation a tMMA system in performing a fetch transaction is illustrated, according to one or more embodiments. In one or more embodiments, two or more tMMA units 45001-45009 can be utilized in performing a transaction. For example, the two or more tMMA units can read multiple words from a memory map. For instance, tMMA system 190 can read multiple contiguous words based on a trigger. At 1105, data can be read from a memory map. In one or more embodiments, tMMA 45001 can specify an address of the memory map, where the address of the memory map is stored in the address register of tMMA 45001, and multiple words of data from the memory map can be read (based on the address stored the address register of tMMA 45001) into and/or stored in one or more of tMMA units 45002-45009. In one or more embodiments, the address of the memory map can be descriptor based.

At 1110, the multiple words of data from the memory map can be stored. In one or more embodiments, a memory read block size can include one word, and the multiple words of data can be read from multiple addresses. For example, the multiple words of data can be read from the multiple addresses using the address of the memory map and multiple address offsets and stored in destinations as shown in Table 5.

TABLE 5

| Address Offset | Storage Destination |
| --- | --- |
| 0 | control register of tMMA unit 45002 |
| 4 | bits 31:0 of address register of tMMA unit 45002 |
| 8 | bits 63:32 of address register of tMMA unit 45002 |
| 12 | data register of tMMA 45002 |
| 16 | data register of tMMA 45003 |

As shown in Table 5, the address offsets can include byte-sized offsets which can include positive offsets. In one or more embodiments, address offsets can include any size which can be positive or negative relative to the address of the memory map.

In one or more embodiments, the address can be automatically incremented or automatically decremented to accommodate the address offsets. For example, tMMA 45001 can include the features of tMMA 4500, and INC 520 can automatically increment or automatically decrement the address stored in address register 515010, and the incremented or decremented address can be fed back into address register 515010. For instance, INC 520 can automatically increment the address stored in address register 515010 such that the memory map can be accessed in accordance with the address of the memory map and address offsets in Table 5.

At 1115, it can be determined whether or not to perform a trace based on the trigger and/or an action in response to the trigger. If it is determined to perform the trace, a trace message can be generated at 1120, and the trace message can be sent at 1125. In one or more embodiments, trace unit 465 can generate the trace message. For example, the trace message can be a Nexus trace message. For instance, the Nexus message can include or be a DTM (e.g., data trace—data read message). In one or more embodiments, the word stored in the control register of tMMA unit 45002 can be included in the DTM. In one or more embodiments, two or more of the multiple words of data can be included in the DTM.

In one or more embodiments, multiple trace messages can be generated and multiple trace messages can be sent that can include two or more of the multiple words of data. For example, data trace messages (DTMs) can include two or more of the multiple words of data. In one or more embodiments, multiple PTC events and/or messages can be used to correlate the DTMs. For example, a first PTC message can include an EVCODE that indicates a tMMA event and be sent before the DTMs, and a second PTC message can include an EVCODE that indicates a tMMA event and be sent subsequent to the DTMs. For instance, the first PTC message and the second PTC message can be used to correlate the multiple DTMs that include the multiple words of data to a transaction associated with the trigger.

Figure 12:
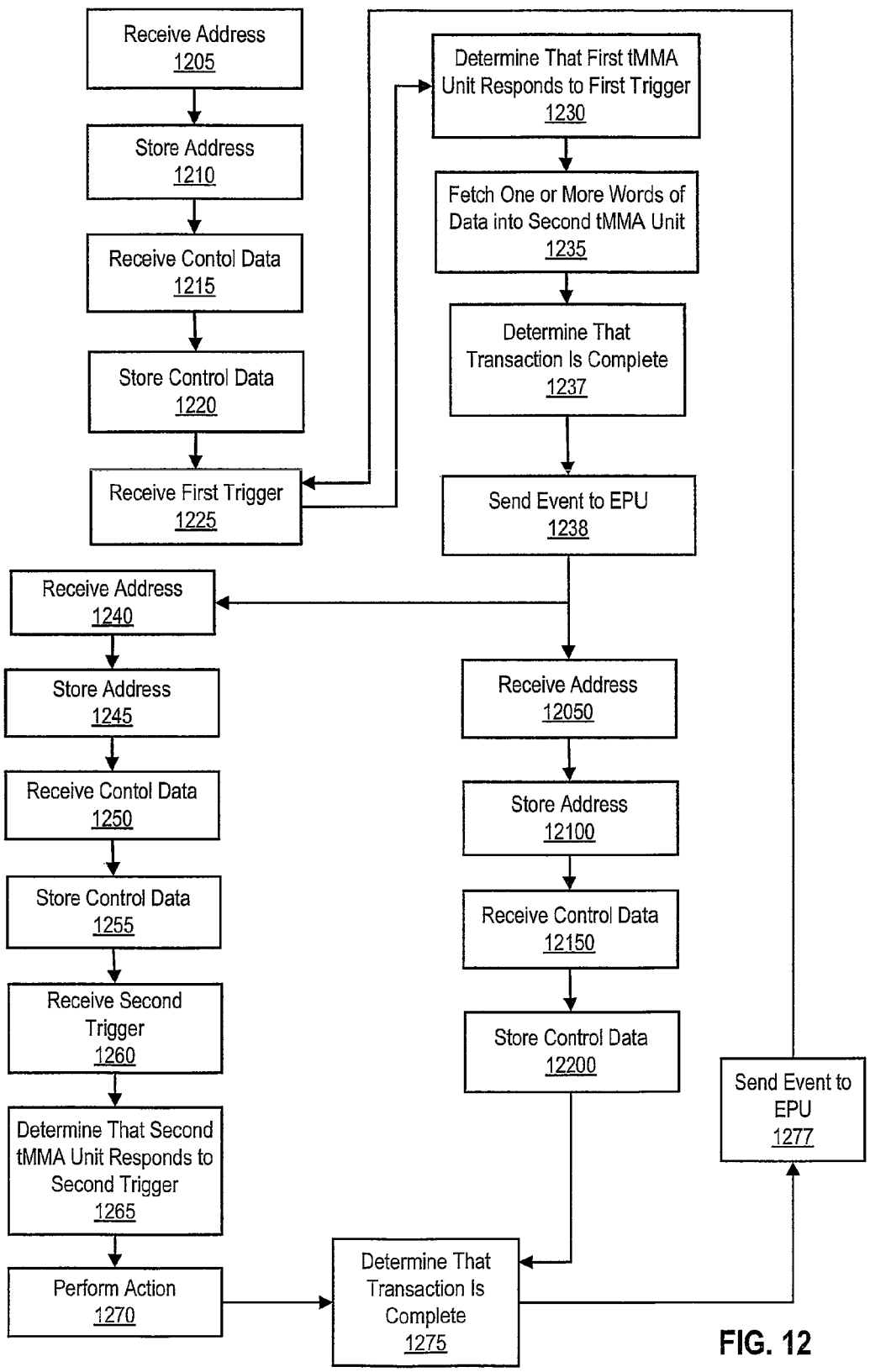
FIG. 12 provides a method that can be used in operation a rigger memory mapped access system in performing a fetch transaction, according to one or more embodiments.

Turning now to FIG. 12, a method that can be used in operation of a tMMA system in performing a fetch transaction is illustrated, according to one or more embodiments. In one or more embodiments, two or more tMMA units 45001-45009 can be utilized in performing a transaction. For example, the two or more tMMA units can read and/or write to a memory map in an order based on two or more triggers. At 1205, a first tMMA unit such as tMMA unit 45001 can receive an address of a memory map. At 1210, the address can be stored in the address register of tMMA unit 45001. At 1215, tMMA unit 45001 can receive control data. At 1220, the control data can be stored in the control register of tMMA unit 45001. At 1225, tMMA unit 45001 can receive a first trigger. At 1230, it can be determined that tMMA unit 45001 responds to the first trigger. In one or more embodiments, the control data stored in the control register of tMMA unit 45001 can be used to determine that tMMA unit 45001 responds to the first trigger. For example, one or more bits of the control register of tMMA unit 45001 can be used in a comparison to determine that tMMA unit 45001 responds to the first trigger.

At 1235, one or more words of data can be fetched from the memory map and stored in a second tMMA unit such as tMMA unit 45002. For example, tMMA 45001 can respond to the first trigger by reading the one or more words of data based on the address stored in the address register of tMMA unit 45001 and/or store the one or more words of data in tMMA unit 45002. At 1237, it can be determined that the transaction of tMMA unit 45001 is complete (e.g., fetching data into tMMA unit 45002 is complete), and an event indicating that the transaction of tMMA unit 45001 is complete can be sent to EPU 191, at 1238.

In one or more embodiments, EPU 191 can use the event to form a trigger. For example, EPU 191 can send the trigger to tMMA unit 45002.

As shown, the method can proceed to 1240 and 12050. In one or more embodiments, 12050 can be performed similarly to or the same as 1205. In one or more embodiments, tMMA unit 45001 can include features of tMMA unit 4500, and tMMA unit 45001 can receive an address of the memory map from INC 520. In one or more embodiments, elements 12100-12200 can be performed similarly to or the same as respective elements 1210-1220.

At 1240, tMMA unit 45002 can receive an address. At 1245, the address can be stored in the address register of tMMA unit 45002. At 1250, tMMA unit 45002 can receive control data, and at 1255, the control data can be stored in the control register of tMMA unit 45002. At 1260, tMMA unit 45002 can receive a second trigger. In one or more embodiments, the second trigger can be delayed by an amount of time transpiring. For example, the second trigger can be sent to tMMA unit 45002 after an amount of time transpiring. In one or more embodiments, tMMA system 190 can be configured with the amount of time. In one or more embodiments, the second trigger can be received from EPU 191, where the second trigger can be based on and/or associated with the event sent to EPU 191 (e.g., at 1238).

At 1265, it can be determined that tMMA unit 45002 responds to the second trigger. At 1270, an action can be performed in response to the second trigger. For example, the action can use the data stored in tMMA 45002 that was stored by tMMA 45001. In one example, the action can send the data stored in the data register of tMMA 45002 to an address of the memory map. For instance, the action can modify a portion of the memory map. In a second example, the action can generate and/or send a trace message. At 1275, it can be determined that the transaction of tMMA unit 45002 is complete, and an event indicating that the transaction of tMMA unit 45002 is complete can be sent to EPU 191, at 1277.

In one or more embodiments, the method can loop back to 1225 for an additional iteration. In one or more embodiments, first and/or second triggers received in the additional iteration can be the same as respective first and/or second triggers from a previous iteration, or first and/or second triggers received in the additional iteration can be different from respective first and/or second triggers from a previous iteration.

It is noted that, in one or more embodiments, one or more of the method elements described herein and/or one or more portions of an implementation of a method element may be performed in varying orders, may be performed concurrently with one or more of the other method elements and/or one or more portions of an implementation of a method element, or may be omitted. Additional method elements can be performed as desired. In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is noted that, in one or more embodiments, one or more of the method elements described herein and/or one or more portions of an implementation of a method element can be implemented using logic implemented in hardware (e.g., one or more integrated circuits). In one example, one or more of the method elements described herein and/or one or more portions of an implementation of a method element can be implemented using one or more state machines implemented using logic implemented in hardware. It is also noted that, in one or more embodiments, one or more of the system elements described herein can be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
  receiving control data;
  storing the control data in a first control register;
  receiving a first address, wherein the received first address is a memory map address of a memory map of a data processing system;
  storing the received first address in a first address register, wherein the first control register and the first address register are included in a first triggered memory map access unit;
  receiving a first trigger in response to an event of a processing unit of the data processing system;
  determining whether to respond to the first trigger based on the control data stored in the first control register;
  determining a transaction to perform based on the control data stored in the first control register;
  if the transaction includes a first type of transaction:
    writing, in response to the received first trigger and using the memory map, first data to the received first address; and
    sending a first trace message that includes the first data; and
  if the transaction includes a second type of transaction:
    reading, in response to the received first trigger and using the memory map, second data from the received first address;
    sending a second trace message that includes the second data, wherein a second triggered memory map access unit includes a second control register and a second address register;
  storing the second data in a second data register of the second triggered memory map access unit;
  receiving a second address and a second trigger; and
  sending, in response to the received second trigger, the second data stored in the second data register of the second triggered memory map access unit to the second address.

2. The method of claim 1,
  wherein the event of the processing unit of the data processing system includes at least one of a change of at least one counter and a watchpoint; and
  wherein the at least one counter maintains a count of cache misses, mispredicted branches, micro operations completed, a number of branch instructions completed, a number of load micro operations completed, a number of store micro operations completed, a number of fetch redirects, a number of branches finished, a number of branches taken, a percentage of branches taken, a number of finished unconditional branches that miss in a branch-target buffer, a number of pipeline stalls, a number of memory management unit (MMU) translations, a number of MMU translation misses, a number of load accesses, a number of store accesses, a number of level one cache locks, a number of level one cache reloads, a number of level one cache cast-outs, a number of cycles a load unit stalls, a number of cycles a store unit stalls, a number of cycles an interrupt is pending before being serviced, a number of times an instruction executes, a number of times a load address accessed, or a number of times a store address accessed.

3. The method of claim 1, wherein at least a trace message of the first trace message and the second trace message includes a Nexus trace message.

4. A system, comprising:
  a triggered memory map access system, wherein the triggered memory map access system includes a first triggered memory map access unit, wherein the first triggered memory map access unit includes a first control register and a first address register;
  wherein the triggered memory map access system is configured for:
    receiving control data;
    storing the control data in the first control register;
    receiving a first address, wherein the received first address is a memory map address of a memory map;
    storing the received first address in the first address register;
    receiving a first trigger in response to an event of a processing unit of a data processing system;
    determining whether to respond to the first trigger based on the control data stored in the first control register;
    determining a transaction to perform based on the control data stored in the first control register;
    if the transaction includes a first type of transaction:
      writing, in response to the received first trigger and using the memory map, first data to the received first address; and
      sending a first trace message that includes the first data; and
    if the transaction includes a second type of transaction:
      reading, in response to the received first trigger and using the memory map, second data from the received first address; and
      sending a second trace message that includes the second data, wherein the triggered memory map access system includes a second triggered memory map access unit that includes a second control register and a second address register;
  storing the second data in a second data register of the second triggered memory map access unit;

receiving a second address and a second trigger; and
sending, in response to the received second trigger, the second data stored in the second data register of the second triggered memory map access unit to the second address.

5. The system of claim 4, further comprising:
a memory medium accessible through the memory map.

6. The system of claim 4, further comprising:
an integrated circuit, wherein the integrated circuit includes the triggered memory map access system.

7. The system of claim 4,
wherein the event of the processing unit of the data processing system includes at least one of a change of at least one counter and a watchpoint; and
wherein the at least one counter maintains a count of cache misses, mispredicted branches, micro operations completed, a number of branch instructions completed, a number of load micro operations completed, a number of store micro operations completed, a number of fetch redirects, a number of branches finished, a number of branches taken, a percentage of branches taken, a number of finished unconditional branches that miss in a branch-target buffer, a number of pipeline stalls, a number of memory management unit (MMU) translations, a number of MMU translation misses, a number of load accesses, a number of store accesses, a number of level one cache locks, a number of level one cache reloads, a number of level one cache cast-outs, a number of cycles a load unit stalls, a number of cycles a store unit stalls, a number of cycles an interrupt is pending before being serviced, a number of times an instruction executes, a number of times a load address accessed, or a number of times a store address accessed.

8. A system, comprising:
a triggered memory map access system that includes a plurality of triggered memory map access units that can read from and/or write to a memory map in an order based on two or more triggers, wherein each of the plurality of triggered memory map access units includes a control register, an address register, and a data register;
wherein a first triggered memory map access unit of the plurality triggered memory map access units is configured for:
receiving a first address;
storing the first address in an address register of the first triggered memory map access unit;
receiving first control data;
storing the first control data in the control register of the first triggered memory map access unit;
receiving a first trigger; and
determining whether to respond to the first trigger;
reading, in response to the received first trigger, data from the memory map;
wherein the triggered memory map access system is configured for:
storing the data read from the memory map in a data register of a second triggered memory map access unit of the plurality triggered memory map access units;
wherein the second triggered memory map access unit is configured for:
receiving a second address;
storing the second address in an address register of the second triggered memory map access unit;
receiving second control data;
storing the second control data in the control register of the second triggered memory map access unit;
receiving a second trigger;
determining whether to respond to the second trigger;
sending, in response to the received second trigger, the data stored in the data register of the second triggered memory map access unit to the second address;
wherein the first triggered memory map access unit is further configured for:
automatically incrementing or decrementing the address stored in the address register of the first triggered memory map access unit to produce a third address;
storing the third address in the first address register;
receiving third control data;
storing the third control data in the control register of the first triggered memory map access unit;
wherein the triggered memory map access system is further configured for performing one or more of said receiving the second address, said storing the second address in the address register of the second triggered memory map access unit, said receiving the second control data, said storing the second control data in the control register of the second triggered memory map access unit, said receiving the second trigger, said determining whether to respond to the second trigger, and said sending the data stored in the data register of the second triggered memory map access unit to the address, while performing one or more of said automatically incrementing or decrementing the address stored in the address register of the first triggered memory map access unit, said storing the third address in the first address register, said receiving the third control data, and said storing the third control data in the control register of the first triggered memory map access unit.

9. The system of claim 8, wherein the triggered memory map access system is further configured for:
determining that a transaction is complete after said sending the data stored in the data register of the second triggered memory map access unit to the second address.

10. The system of claim 8, further comprising:
an event processing unit (EPU) coupled to the triggered memory map access system;
wherein the triggered memory map access system is further configured for:
sending an event to the EPU, wherein the event indicates that said storing the data in the data register of the second triggered memory map access unit is complete;
wherein the EPU is configured for:
receiving the event; and
sending the second trigger in response to the event.

11. The system of claim 8, further comprising:
an integrated circuit, wherein the integrated circuit includes the triggered memory map access system.

12. The system of claim 8, further comprising:
a memory medium accessible through the memory map.

* * * * *